C. T. BOONE.
HOSE AND FAUCET COUPLING.
APPLICATION FILED JULY 10, 1919.

1,369,162.

Patented Feb. 22, 1921.

INVENTOR:
Charles T. Boone.
BY HIS ATTORNEY:
A. M. Carlsen.

UNITED STATES PATENT OFFICE.

CHARLES T. BOONE, OF MINNEAPOLIS, MINNESOTA.

HOSE AND FAUCET COUPLING.

1,369,162.   Specification of Letters Patent.   Patented Feb. 22, 1921.

Application filed July 10, 1919. Serial No. 309,917.

*To all whom it may concern:*

Be it known that I, CHARLES T. BOONE, a citizen of the United States, residing at Minneapolis, in the county of Hennepin and State of Minnesota, have invented a new and useful Hose and Faucet Coupling, of which the following is a specification.

My invention relates to couplings for readily coupling a water hose to a faucet.

Figure 1:
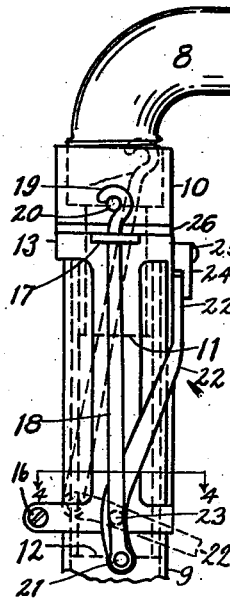
Figure 2:
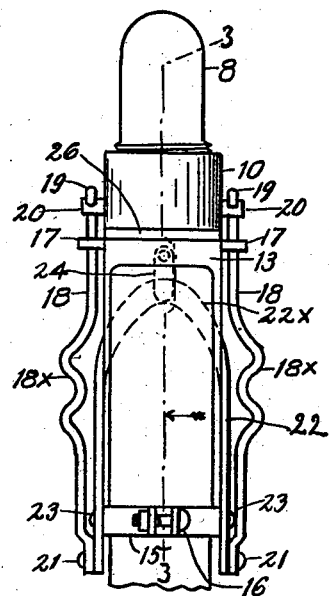
Figures 3, 4:
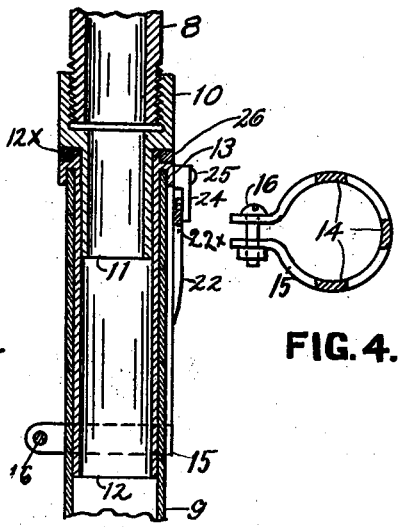
Figures 7, 8:
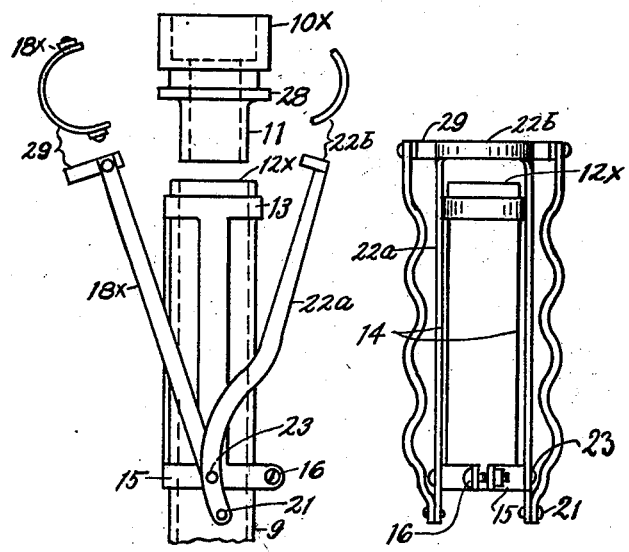
Figures 5, 6:
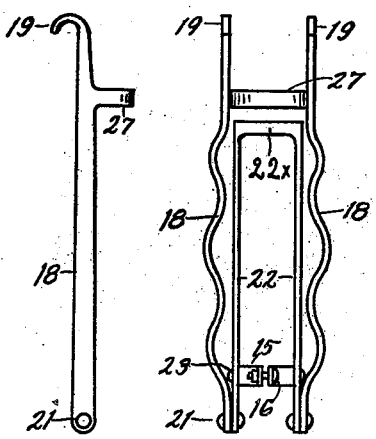

In the accompanying drawing; Figure 1 is a side elevation of my improved hose coupling shown as applied to a hose and a faucet. Fig. 2 is a left side view of Fig. 1. Fig. 3 is a section on the line 3—3 in Fig. 2. Fig. 4 is a section on line 4—4 in Fig. 1 of the yoke only. Fig. 5 shows a modification of the lever 22 and rods 18 in Fig. 2. Fig. 6 is a side view of the hooks in Fig. 5. Fig. 7 is a side view of the device with some of its parts separated and most of them modified. Fig. 8 is a right side view of Fig. 7 with the hose and the member 10 omitted.

Referring to the drawing by reference numerals, 8 designates a portion of a faucet to which a hose 9 is to be attached. Upon the nose of the faucet is threaded a coupling member 10, or it may be like $10^x$ in Fig. 7, and may remain permanently on the faucet, or for new faucets it may be formed integral with the faucet. Said member 10 is formed with a short reduced outlet tube 11 which is adapted to project into a longer tube 12 (best shown in Fig. 3) which projects slightly above and is secured in the head collar 13 of a yoke or hose harness consisting of said collar, three parallel flat bars 14 and a clamping collar 15 (see Fig. 4) having a screw 16 by which it is tightened about the hose 9 and the tube 12 within the hose, so as to form a water tight joint and also hold the hose with its end inserted in the yoke and in the collar 13 thereof.

In Figs. 1, 2, and 3 the collar 13 is provided with two perforated ears, 17, in which are loosely guided two rods 18, having their upper ends formed with hooks 19 adapted to engage trunnions 20 on the member 10. The lower ends of the rods 18 are pivoted at 21 to the lower ends of a V-shaped lever 22, which is fulcrumed at 23 to the collar 15, in such a position relative to the pivots 21 that when the part $22^x$ of the lever is brought upward and against the side of the yoke the pulling strain of the rods 18 tends to hold the lever in said position. The lever may also be held in said position by a thumb catch 24 pivoted at 25 to the upper collar.

Between the member 10 and the collar 13 is placed about the projecting end $12^x$ of the tube 12 a packing ring 26 of rubber or leather, which prevents escape of water upward between the tubes 11 and 12. If said packing ring becomes reduced by shrinkage and wear such wear is taken up by the spring action of the corrugations $18^x$ of the rods 18.

In the operation if the hose is to be attached to the faucet the lever 22 is swung downward about as shown in dotted lines in Fig. 1, with the hooks 19 thus standing as shown in dotted lines the collar 13 is pushed up against the member 10, with the packing ring 26 between them, the lever 22 being now swung upward and locked, the hooks 19 are thereby caused to swing into engagement with the trunnions or studs 20 and pinch the packing ring tightly between the collar 13 and the member 10, the water may then be turned on by opening the faucet. To remove the hose the water is turned off and the hooks 19 disengaged by throwing the lever 22 downward.

In the modification shown in Figs. 7 and 8, the member $10^x$ instead of having trunnions is given a collar 28 and the rods $18^x$ carry a pivoted segment or half collar 29 adapted to engage upon said collar and the lever $22^a$ may have a segmental top piece $22^b$ adapted to enter upon the collar 28 from the other side when the lever is closed up, with the hose connected to the faucet.

In the modification shown in Figs. 5 and 6 the rods 18 are secured together by an arched cross bar 27; when this bar is used the guiding lugs or ears 17 may be dispensed with, as it is an easy matter to swing one of the hooks 19 and thereby also the other into engagement with the trunnions.

What I claim is:

1. A hose and faucet coupling comprising an internally threaded member adapted to go onto the nose of the faucet and having a short outlet tube, a longer tube adapted for insertion in the end of the hose and having at its upper end a fixed collar with a tubular yoke adapted to extend a short distance upon the hose and comprising an open-sided collar with a screw for clamping it about the hose and thus closing the hose tight about the longer tube inside thereof, a lever pivoted to said yoke, and means operated by the lever and adapted to engage the member on the faucet and draw it tightly against the top collar of the yoke.

2. The structure specified in claim 1, and a soft packing ring between said meeting collars.

3. The structure specified in claim 2, said top collar of the yoke having a reduced extension entering into the packing ring.

4. The structure specified in claim 1, said lever having its lower end bifurcated and pivoted one leg at each side of the yoke or the lower collar thereof, and said means operated by the lever consisting of two rods pivoted one to each leg and provided at their upper ends with means for engaging the member on the faucet, the latter having means for facilitating such engagement.

5. The structure specified in claim 1, and means for holding said lever against accidental motion when the parts are coupled together.

In testimony whereof I affix my signature.

CHARLES T. BOONE.